United States Patent
Park et al.

(10) Patent No.: US 12,494,548 B2
(45) Date of Patent: Dec. 9, 2025

(54) SEPARATOR COATING LAYER FOR LITHIUM METAL BATTERY, SEPARATOR FOR LITHIUM METAL BATTERY, AND LITHIUM METAL BATTERY COMPRISING THE SAME

(71) Applicant: POSTECH Research and Business Development Foundation, Pohang-si (KR)

(72) Inventors: Soo Jin Park, Pohang-si (KR); Gyu Jin Song, Pohang-si (KR); You Min Bang, Yangpyeong-gun (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 819 days.

(21) Appl. No.: 17/709,779

(22) Filed: Mar. 31, 2022

(65) Prior Publication Data

US 2023/0067263 A1    Mar. 2, 2023

(30) Foreign Application Priority Data

Aug. 25, 2021  (KR) .................. 10-2021-0112256

(51) Int. Cl.
*H01M 50/449* (2021.01)
*H01M 10/052* (2010.01)
(Continued)

(52) U.S. Cl.
CPC ....... *H01M 50/449* (2021.01); *H01M 10/052* (2013.01); *H01M 50/403* (2021.01); *H01M 50/434* (2021.01)

(58) Field of Classification Search
CPC ............ H01M 50/449; H01M 10/052; H01M 50/403; H01M 50/434; H01M 4/36;
(Continued)

(56) References Cited

U.S. PATENT DOCUMENTS

2020/0358064 A1* 11/2020 Kwon ................ H01M 10/052
2021/0091368 A1*  3/2021 House ................ H01M 4/525

FOREIGN PATENT DOCUMENTS

| CN | 110176568 A | * | 8/2019 | .......... H01M 50/403 |
| KR | 20110011932 |   | 2/2011 | |
| WO | WO-2015088451 A1 | * | 6/2015 | ........... C01B 32/194 |

OTHER PUBLICATIONS

Heravi MM, Ghavidel M, Mohammadkhani L. Beyond a solvent: triple roles of dimethylformamide in organic chemistry. RSC Adv. Aug. 3, 2018;8(49):27832-27862. doi: 10.1039/c8ra04985h. PMID: 35542702; PMCID: PMC9084326. (Year: 2018).*

(Continued)

*Primary Examiner* — James M Erwin
*Assistant Examiner* — Sarah Arimintia Applegate
(74) *Attorney, Agent, or Firm* — LEX IP MEISTER, PLLC

(57) ABSTRACT

In embodiments of the present invention, a coating layer including a fluorinated graphene oxide (FGO) material is coated on a separator and the separator is used for a lithium metal battery. Accordingly, it is possible to prevent growth of dendrites of a lithium metal negative electrode by forming lithium fluoride with good ion conductivity during use of the lithium metal battery, and to improve energy density and stability of the lithium metal battery compared to using a conventional ceramic material as a coating layer and thus greatly contribute to commercialization of the lithium metal battery.

5 Claims, 3 Drawing Sheets

(51) Int. Cl.
  *H01M 50/403* (2021.01)
  *H01M 50/434* (2021.01)
(58) Field of Classification Search
  CPC .. H01M 4/382; H01M 50/409; H01M 50/446; H01M 50/451; H01M 50/457; H01M 50/431
  See application file for complete search history.

(56) References Cited

OTHER PUBLICATIONS

E., H., Fan, H. Fluorinated functionalization of graphene oxide and its role as a reinforcement in epoxy composites. J Polym Res 26, 42 (2019). https://doi.org/10.1007/s10965-018-1687-z (Year: 2019).*
Mathkar, A., Narayanan, T.N., Alemany, L.B., Cox, P., Nguyen, P., Gao, G., Chang, P., Romero-Aburto, R., Mani, S.A. and Ajayan, P.M. (2013), Synthesis of Fluorinated Graphene Oxide and its Amphiphobic Properties. Particle Particle Systems Characterization, 30: 266-272. (Year: 2013).*
Vizintin, A. et al. Fluorinated Reduced Graphene Oxide as an Interlayer in Li—S Batteries. Chem. Mater. 27, 7070-7081 (2015). (Year: 2015).*
Translation of CN 110176568 A (Year: 2019).*
Jiahao Guo et al., "Fluorine-doped graphene with an outstanding electrocatalytic performance for efficient oxygen reduction reaction in alkaline solution", R. Soc. Open Sci. vol. 5, 180925, Oct. 3, 2018 (Year: 2018).*
Zhaofeng Wang, Jinqing Wang, Zhangpeng Li, Peiwei Gong, Xiaohong Liu, Libin Zhang, Junfang Ren, Honggang Wang, Shengrong Yang, Synthesis of fluorinated graphene with tunable degree of fluorination, Carbon, vol. 50, Issue 15, 2012, pp. 5403-5410, ISSN 0008-6223 (Year: 2012).*
Machine translation of CN-110176568-A (Year: 2019).*
Vizintin, A. et al. Fluorinated Reduced Graphene Oxide as an Interlayer in Li—S Batteries. Chem. Mater. 27, 7070-7081 (Year: 2015).*
Ju Young Kim et al., "Graphene Oxide Induced Surface Modification for Functional Separators in Lithium Secondary Batteries", Scientific Reports. vol. 9, issue 2464, p. 1-7, Feb. 21, 2019.
Alen Vizintin et al., "Effective Separation of Lithium Anode and Sulfur Cathode in Lithium-Sulfur Batteries", ChemElectroChem. vol. 1, p. 1040-1045, Apr. 30, 2014.
Fu-Gang Zhao et al., "Fluorinated graphene:facile solution preparation and tailorable properties by fluorine-content tuning", J. Mater. Chem. A. vol. 2, p. 8782-8789, Mar. 31, 2014.
Jiahao Guo et al., "Fluorine-doped graphene with an outstanding electrocatalytic performance for efficient oxygen reduction reaction in alkaline solution", R. Soc. Open Sci. vol. 5, 180925, Oct. 3, 2018.

* cited by examiner

[FIG. 1]
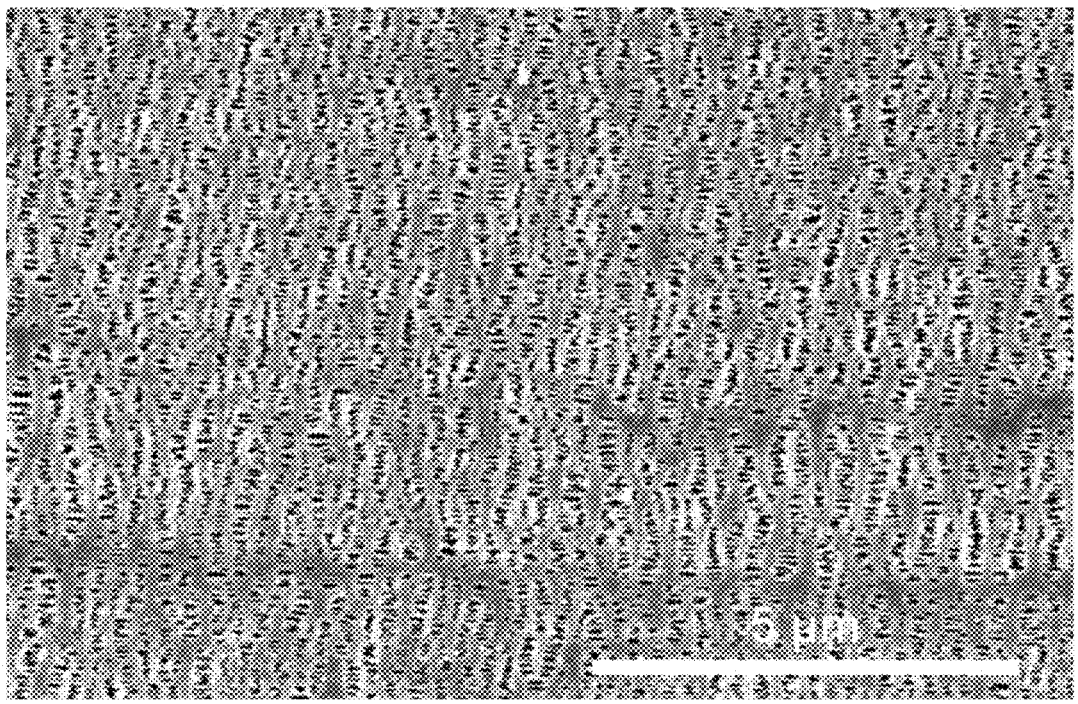
[FIG. 2]
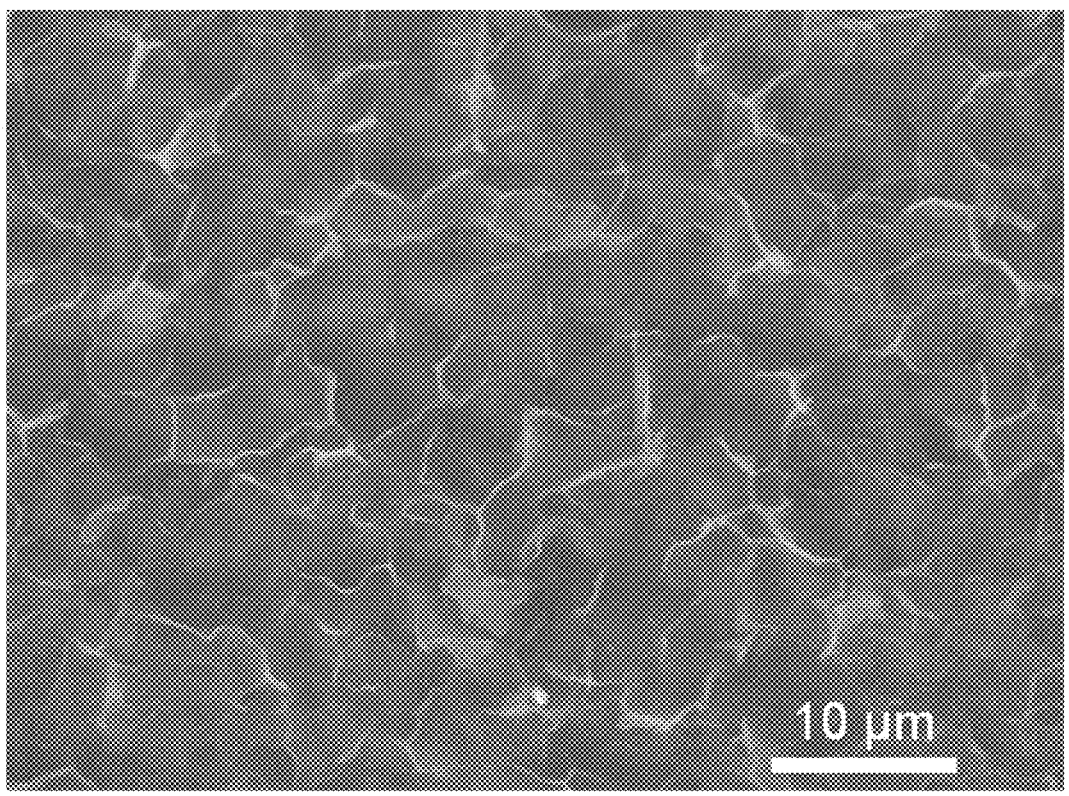

[FIG. 3]
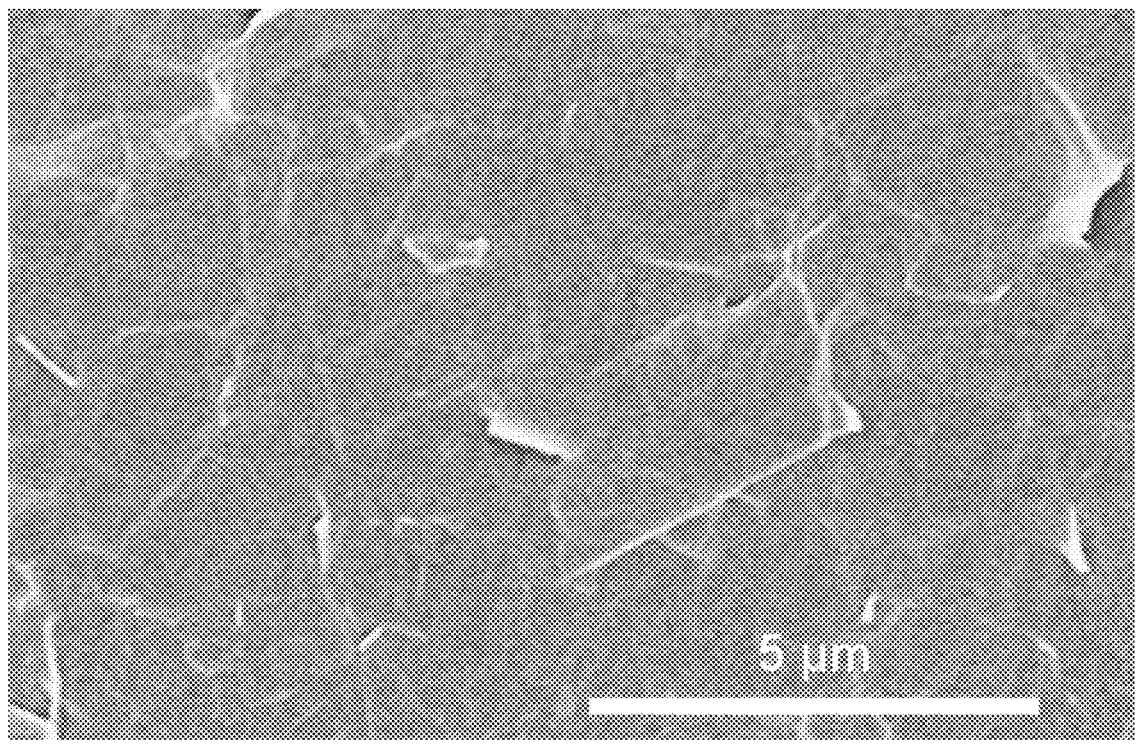
[FIG. 4]
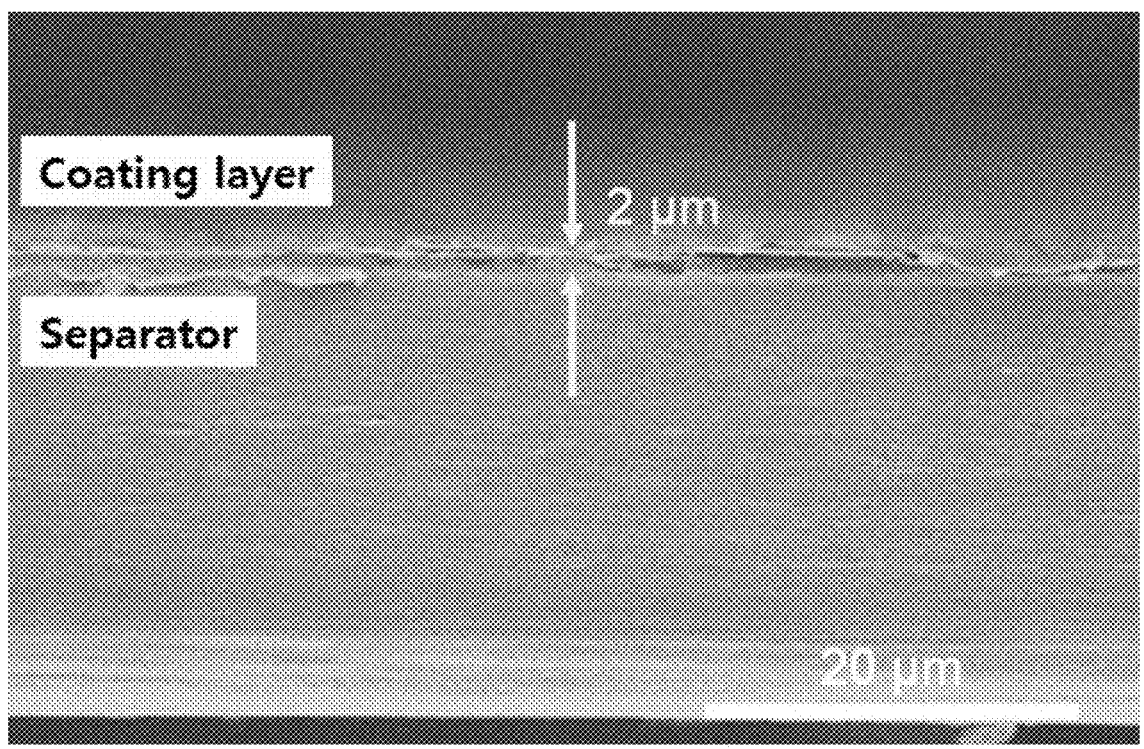

[FIG. 5]
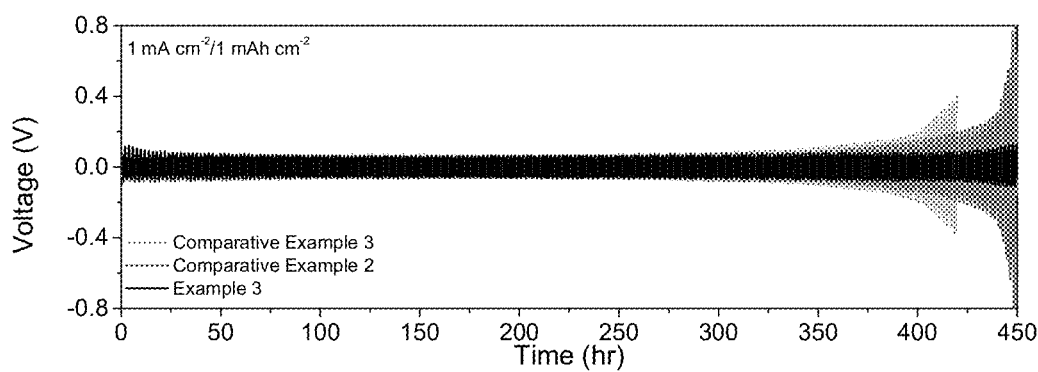
[FIG. 6]
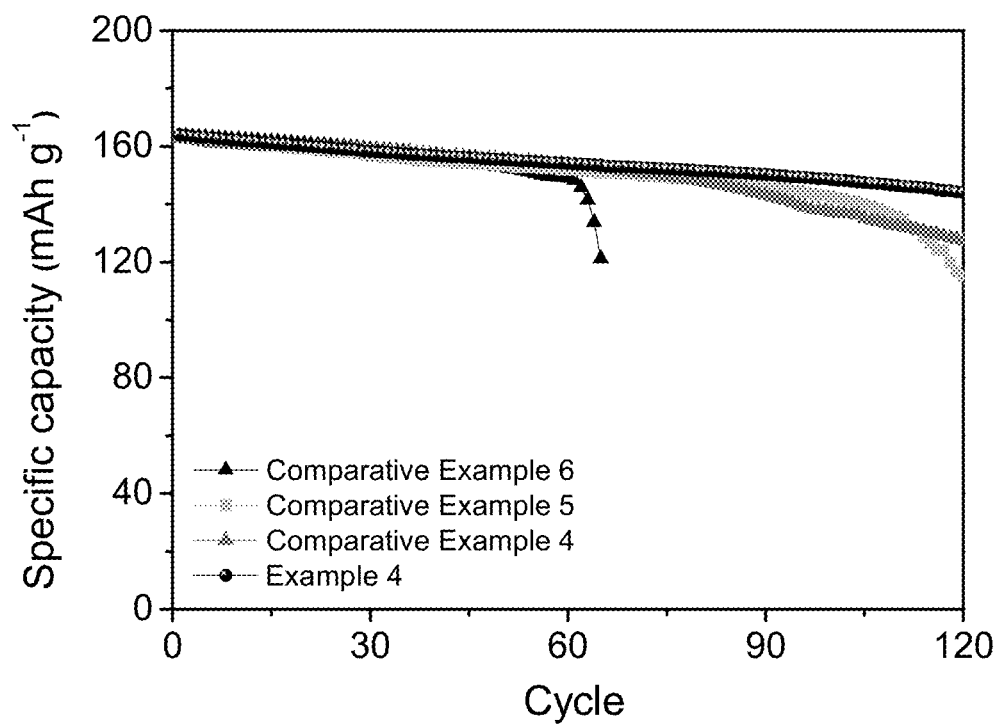

SEPARATOR COATING LAYER FOR LITHIUM METAL BATTERY, SEPARATOR FOR LITHIUM METAL BATTERY, AND LITHIUM METAL BATTERY COMPRISING THE SAME

BACKGROUND OF THE INVENTION

1. Field of the Invention

The present disclosure relates to a separator coating layer for a lithium metal battery, a separator for a lithium metal battery, and a lithium metal battery including the same. More particularly, the present disclosure relates to a coating layer coated on a separator used in a lithium metal battery, a separator coated with the coating layer, and a lithium metal battery including the separator and having lithium metal as an electrode.

2. Description of the Related Art

As consumer demands change due to digitalization and high performance of electronic products, market demands are also changing with development of batteries of thinness and light weight and with high capacity due to high energy density. In addition, to cope with future energy and environmental issues, development of hybrid electric vehicles, electric vehicles, and fuel cell vehicles is being actively carried out, and thus, there is a demand for increasing size of a battery for a vehicle power supply.

Lithium-based secondary batteries are being put to practical use as small, lightweight and high-capacity rechargeable batteries, and are used in portable electronic and communication devices such as small video cameras, mobile phones, laptop computers. A lithium secondary battery consists of a positive electrode, a negative electrode, a separator, and an electrolyte, and lithium ions from a positive electrode active material are inserted into a negative electrode active material by charging and desorbed again during discharging. As such, the charging and discharging is possible because the lithium ions play a role of transferring energy while moving back and forth between the electrodes.

This lithium secondary battery uses a graphite-based material as the negative electrode, which is a great limitation in realizing a lithium secondary battery having a higher energy density because it almost utilizes a theoretical capacity limit level. Therefore, there have been numerous attempts to utilize lithium metal, which has a capacity ten times or more per mass, as the negative electrode. A lithium secondary battery including such the lithium metal negative electrode is called a lithium metal battery.

However, in the lithium metal negative electrode, dendrites are formed in repeated charge/discharge processes due to an electrochemical reaction behavior. This phenomenon makes distribution of current non-uniform and causes a short circuit between the positive and negative electrodes inside the battery by piercing the separator due to continuous dendrite growth due to continuous side reaction with the electrolyte and the current concentration phenomenon. In addition, a loss of lithium, which is physically called 'dead Li', leads to a significant reduction in a lifespan of the secondary battery. For these reasons, there is an issue in that it is practically difficult to use as the secondary battery.

In addition, the lithium metal negative electrode has issues of repeated generation of solid electrolyte interphase (SEI) and increased resistance caused by a gradually increasing specific surface area. As a result, it causes issues such as low charge/discharge efficiency, electrical short circuit and reduction in coulombic efficiency in the lithium metal secondary battery. These issues rapidly deteriorate stability and lifespan characteristics of the lithium metal battery during cycles, and are an obstacle to commercialization of the lithium metal secondary battery.

In particular, Korea Patent No. 10-1125013 (title of the invention: Method for preparing cross-linked ceramic-coated separator containing ionic polymer, ceramic-coated separator prepared by the method, and lithium secondary battery using the same) is characterized by forming a coating layer in which a polymer having ionic conductivity and a ceramic are combined on a surface of a polymer separator. However, for the prior patent, the coating layer including an inorganic material such as a ceramic requires polymer mixing for structuring and a multi-step process is required, and since the ceramic has a greater weight than a carbon-based material, there is issue of lowering energy density of secondary batteries made after that.

On the other hand, as a high-capacity positive electrode, a positive electrode material in form of a transition metal oxide causes metal ion elution due to a structural issue in charging/discharging process, which has disadvantage of exacerbating instability of a negative electrode interface. Accordingly, many studies are being conducted to develop an interface material for individually suppressing dendrites growth of lithium metal and suppressing side reactions due to metal elution from the positive electrode.

PRIOR ART DOCUMENT

Patent Document 1: Korea Patent No. 10-1125013 (title of the invention: Method for preparing cross-linked ceramic-coated separator containing ionic polymer, ceramic-coated separator prepared by the method, and lithium secondary battery using the same).

SUMMARY OF THE INVENTION

Problem to be Solved by the Invention

The present invention has been made in an effort to solve above issues by introducing a coating layer on a surface of a separator rather than an electrode surface for realization of a high-energy lithium metal battery, and an object of the present invention is to provide a stable high-energy lithium metal battery by improving stable lithium metal interface formation and an adsorption ability of transition metal ions using a fluorinated graphene oxide material as a separator coating layer.

Means for Solving the Problem

An exemplary embodiment of the present invention provides a separator coating layer for a lithium metal battery including a fluorinated graphene oxide (FGO) material.

The FGO may be formed by immersing a film of a graphene oxide (GO) material in a solution prepared by dissolving a compound including a fluorine element in a solvent.

The compound including the fluorine element may be diethylaminosulfur trifluoride.

The solvent may be one of 1,2-dichlorobenzene, chloromethane, dichloromethane, dimethylformamide, tetrahydrofuran, N-methyl-2-pyrrolidone, deichloroethane, pyridine, chlorobenzene, benzene, and toluene.

The FGO may be fluorinated by being immersed in the solution and then washed with a hydrophilic material and a hydrophobic material sequentially.

The FGO may be washed sequentially with water, ethanol, acetone, tetrahydrofuran, and water.

The FGO may be formed by mixing a metal fluoride and a graphene oxide followed by heat treatment.

The metal fluoride may be one of cobalt (III) fluoride ($CoF_3$), copper(II) fluoride ($CuF_2$), and zinc(II) fluoride ($ZnF_2$).

The separator coating layer for the lithium metal battery according to the exemplary embodiment of the present invention may have a thickness of 1 to 3 micrometers.

An exemplary embodiment of the present invention provides a separator for a lithium metal battery in which a coating layer including a fluorinated graphene oxide material is coated on a surface.

The coating layer including the fluorinated graphene oxide material may be supplied to and coated on the surface of the separator in a dispersed state through sonication after being immersed in a material for dispersion.

The material for dispersion may be ethanol.

Another exemplary embodiment of the present invention provides a lithium metal battery including a negative electrode, a positive electrode, and a separator disposed between the negative electrode and the positive electrode, wherein each of a surface of the negative electrode side and a surface of the positive electrode side of the separator is coated with a coating layer including a fluorinated graphene oxide material.

Both the negative electrode and the positive electrode may be made of lithium metal.

The negative electrode may be made of lithium metal, and the positive electrode may be made of a material in which a transition metal oxide is used as an active material.

The material in which the transition metal oxide is used as the active material may be one of $LiNi_xCo_yMn_zO_2$ (NCMxyz), $LiCoO_2$ (LCO), $LiNiO_2$ (LNO), $LiMn_2O_4$ (LMO), and $LiFePO_4$ (LFP).

Advantageous Effects

According to embodiments of the present invention, by coating a fluorinated graphene oxide (FGO) material on a separator and using the separator for a lithium metal battery, it is possible to prevent growth of dendrites of a lithium metal negative electrode by forming lithium fluoride with good ion conductivity during use of the lithium metal battery, and to improve energy density and stability of the lithium metal battery compared to using a conventional ceramic material as a coating layer and thus greatly contribute to commercialization of the lithium metal battery.

BRIEF DESCRIPTION OF THE DRAWINGS

FIG. 1 is a diagram illustrating a scanning electron microscope (SEM) photograph of a separator without a coating layer;

FIG. 2 is a diagram illustrating a scanning electron microscope (SEM) photograph of a separator coating layer in Comparative Example 1;

FIG. 3 is a diagram illustrating a scanning electron microscope (SEM) photograph of a separator coating layer in Example 2;

FIG. 4 is a cross-sectional diagram of a separator of FIG. 3;

FIG. 5 is a diagram illustrating evaluation results of lithium metal-lithium metal batteries for comparing Example 3, Comparative Example 2, and Comparative Example 3, which shows distribution of voltage generated during electrodeposition/desorption processes of lithium metal over time as a graph; and FIG. 6 is a diagram illustrating evaluation results of lithium metal-transition metal oxide batteries for comparing Example 4, Comparative Example 4, Comparative Example 5, and Comparative Example 6, which illustrates capacities according to lifespans of lithium metal batteries as a graph.

DETAILED DESCRIPTION

Although the present invention has been described with reference to embodiments illustrated in the drawings, which are merely exemplary, those skilled in the art will understand that various modifications and other equivalent embodiments are possible therefrom. Therefore, the genuine technical protection scope of the present invention should be determined by technical ideas of the appended claims.

The present invention provides a coating layer including a fluorinated graphene oxide (FGO) material, a separator coated with the coating layer, and a lithium metal battery in which the separator is disposed between a negative electrode and a positive electrode.

The FGO may be formed by immersing a film of a graphene oxide (GO) material in a solution prepared by dissolving a compound including a fluorine element in a solvent (Making Method 1). Alternatively, the FGO may be formed by mixing a metal fluoride and the GO followed by heat treatment (Making Method 2).

In Making Method 1, the compound including the fluorine element may be diethylaminosulfur trifluoride. The solvent may be one of 1,2-dichlorobenzene, chloromethane, dichloromethane, dimethylformamide, tetrahydrofuran, N-methyl-2-pyrrolidone, deichloroethane, pyridine, chlorobenzene, benzene, and toluene. The FGO is fluorinated by being immersed in the solution, and then washed with a hydrophilic material and a hydrophobic material sequentially and then dried. Specifically, the FGO may be washed sequentially with water, ethanol, acetone, tetrahydrofuran, and water. Then, the coating layer of the FGO material is supplied to and coated on a surface in a dispersed state through sonication after being immersed in a material for dispersion. Here, the material for dispersion may be ethanol.

In Making Method 2, the metal fluoride may be one of cobalt (III) fluoride ($CoF_3$), copper(II) fluoride ($CuF_2$), and zinc(II) fluoride ($ZnF_2$).

The separator coating layer for the lithium metal battery may have a thickness of 1 to 3 micrometers. In the case that thickness of the coating layer is less than 1 micrometer, there is an issue that a surface of the separator is not sufficiently covered and thus non-uniform. In the case that the thickness of the coating layer is 3 micrometers or more, there is an issue that lithium ions do not smoothly move through the separator. Accordingly, the separator coating layer for the lithium metal battery may have a thickness in the range of 1 to 3 micrometers.

In the separator for the lithium metal battery according to the present invention, the coating layer including the FGO material is coated on both a surface of the negative electrode side and a surface of the positive electrode side, respectively. In this case, both the negative electrode and the positive electrode may be made of lithium metal (Making Method 3), and only the negative electrode may be made of lithium metal and the positive electrode may be made of a material in which a transition metal oxide is used as an active material (Making Method 4).

The lithium metal battery according to Making Method 3 may also be called a lithium metal symmetric cell because both the negative electrode and the positive electrode are made of the lithium metal material.

The lithium metal battery according to Making Method 4 may also be called a lithium metal full cell because the negative electrode is made of the lithium metal material and the positive electrode is made of the transition metal oxide. In Making Method 4, the material in which the transition metal oxide is used as the active material may be one of $LiNi_xCo_yMn_zO_2$ (NCMxyz), $LiCoO_2$ (LCO), $LiNiO_2$ (LNO), $LiMn_2O_4$ (LMO), and $LiFePO_4$ (LFP).

According to the present invention, the coating layer including the FGO material is coated on the separator and the separator is used for the lithium metal battery. Accordingly, it is possible to prevent growth of dendrites of the lithium metal negative electrode by allowing lithium fluoride to be formed on the surface of the separator during use of the lithium metal battery, and to improve energy density and stability of the lithium metal battery compared to using a conventional ceramic material as a coating layer and thus greatly contribute to commercialization of the lithium metal battery.

The present invention provides a method of making a separator coating layer for a lithium metal battery including preparing a fluorinated graphene oxide.

The preparing of the fluorinated graphene oxide may include immersing a film of a graphene oxide material in a solution prepared by dissolving a compound including a fluorine element in a solvent for 60 to 90 hours or 70 to 80 hours.

The solvent may be one of 1,2-dichlorobenzene, chloromethane, dichloromethane, dimethylformamide, tetrahydrofuran, N-methyl-2-pyrrolidone, deichloroethane, pyridine, chlorobenzene, benzene, and toluene.

The fluorinated graphene oxide is fluorinated by being immersed in the solution, and then washed with a hydrophilic material and a hydrophobic material sequentially and then dried. Specifically, the fluorinated graphene oxide may be washed sequentially with water, ethanol, acetone, tetrahydrofuran, and water. And, the coating layer of the fluorinated graphene oxide material is supplied to and coated on a surface in a dispersed state through sonication after being immersed in a material for dispersion. Here, the material for dispersion may be ethanol.

The preparing of the fluorinated graphene oxide may include mixing a metal fluoride and a graphene oxide followed by heat treatment to form the fluorinated graphene oxide.

The metal fluoride may be one of cobalt (III) fluoride ($CoF_3$), copper(II) fluoride ($CuF_2$), and zinc(II) fluoride ($ZnF_2$).

The heat treatment may be performed at a temperature of 400 to 800° C. for 2 to 6 hours.

Hereinafter, Examples 1 to 4 of the present invention will be described in comparison with Comparative Examples 1 to 6.

[Example 1]: Preparing of a Fluorinated Graphene Oxide Material

A 0.5 weight solution is prepared by dissolving diethylaminosulfur trifluoride (DAST) in a solvent of 1,2-dichlorobenzene (DCB). Then, 0.024 g of a graphene oxide material is immersed in the solution and maintained for 75 hours. Finally, to remove residue, the film is washed sequentially with water, ethanol, acetone, tetrahydrofuran, and water, and then dried to obtain a fluorinated conductive coating layer material.

[Example 2]: Making of a Separator Coated with the Fluorinated Graphene Oxide Material The fluorinated graphene oxide material obtained in Example 1 is immersed in ethanol and dispersed through a sonication process, and then is coated on a surface of a separator through a vacuum filter to make a separator coated with the fluorinated graphene oxide material.

[Example 3]: Making of a Lithium Metal Symmetric Cell

Both a negative electrode and a positive electrode are made using lithium metal, and each of a surface of the negative electrode side and a surface of the positive electrode side of the separator is coated with the coating layer of Example 2 to make a lithium metal battery.

[Example 4]: Making of a Lithium Metal Full Cell

A negative electrode is made of lithium metal and a positive electrode is made using an electrode in which $LiNi_{0.6}Co_{0.2}Mn_{0.2}O_2$ (NCM622) transition metal oxide is used as an active material, and each of a surface of the negative electrode side and a surface of the positive electrode side of the separator is coated with the coating layer of Example 2 to make a lithium metal battery.

[Comparative Example 1]: Coating a Separator Using a Non-Fluorinated Graphene Oxide Material as a Coating Layer A lithium metal battery is made by immersing and dispersing a non-fluorinated graphene oxide material in ethanol and then coating it on a surface of a separator through a vacuum filter.

[Comparative Example 2]: Making of a Lithium Metal Symmetric Cell & a Asymmetric Non-Fluorinated GO Coating Separator Electrodes are configured in the same manner as in Example 3, but the non-fluorinated graphene oxide material is coated on only one of a surface of the negative electrode side and a surface of the positive electrode side of a separator to make a lithium metal battery.

[Comparative Example 3]: Making of a Lithium Metal Symmetric Cell & a Non-Coated Separator Electrodes are configured in the same manner as in Example 3, but no coating layer is coated on a separator to make a lithium metal battery.

[Comparative Example 4]: Making of a Lithium Metal Full Cell & an FGO Negative Electrode Side Coating Separator Electrodes are configured in the same manner as in Example 4, but the coating layer of Example 2 is coated only on a surface of the negative electrode side of a separator to make a lithium metal battery.

[Comparative Example 5]: Making of a Lithium Metal Full Cell & an FGO Positive Electrode Side Coating Separator Electrodes are configured in the same manner as in Example 4, but the coating layer of Example 2 is coated only on a surface of the positive electrode side of a separator to make a lithium metal battery.

[Comparative Example 6]: Making of a Lithium Metal Full Cell & a Non-Coated Separator Electrodes are configured in the same manner as in Example 4, but no coating layer is coated on a separator to make a lithium metal battery.

Referring to FIG. 1, it is found that a plurality of pores having a diameter within 30 nanometers to 100 nanometers exist on the surface of the separator on which no coating layer exists. Lithium ions move through an electrolyte through the pores.

FIG. 2 illustrates an image of the surface of the separator according to Comparative Example 1, and the surface of the separator is coated with the non-fluorinated graphene oxide material. It is found that plate-shaped particles in a shape of torn paper are distributed.

FIG. 3 and FIG. 4 illustrate images of the surface of the separator according to Example 2, and the surface of the separator is coated with the fluorinated graphene oxide material. It can be found that plate-shaped particles are smaller and more uniformly and homogeneously dispersed, compared to Comparative Example 1 illustrated in FIG. 2. In this case, the thickness of the coating layer may be 1 to 3 micrometers (most preferably, 2 micrometers).

FIG. 5 is a graph illustrating distribution of voltage values formed on the separator over time to show changes in the voltage values generated during repeated lithium electrode-position/desorption processes in the lithium metal symmetric cell, i.e., the battery in which both the negative electrode and the positive electrode are made of the lithium metal for Example 3, Comparative Example 2, and Comparative Example 3, respectively. As usage time of the lithium metal battery increases, the dendrites are formed and accordingly an over potential increase phenomenon may occur due to continuous electrolyte decomposition. It is determined that occurrence time of the over potential is about 400 hr in the case of Comparative Example 3 and about 430 hr in the case of Comparative Example 2, and does not appear in the graph of FIG. 5 in the case of Example 3 (it occurs after 450 hr). From this, it is determined that Comparative Example 2 compared to Comparative Example 3, and Example 3 of the present invention compared to Comparative Example 2 are electrically and structurally much more stable and have high driving efficiency, and are much advantageous for commercialization.

FIG. 6 is a graph illustrating changes in capacity according to the lifespan of the lithium metal battery in the lithium metal full cell, i.e., the battery in which the negative electrode is made of the lithium metal and the positive electrode is made of NCM622, one of transition metal oxides, for Example 4, Comparative Example 4, Comparative Example 5, and Comparative Example 6, respectively. In FIG. 6, it is determined that total capacities of the lithium metal batteries gradually decrease as driving cycles increase for all of Example 4, Comparative Example 4, Comparative Example 5, and Comparative Example 6. Meanwhile, it is determined that the capacities of the lithium metal batteries rapidly decrease at about 60 driving cycles for Comparative Example 6 and at about 90 driving cycles in Comparative Examples 4 and 5. For Example 4, it is determined that the capacity of the lithium metal battery decreases very slowly until 120 driving cycles.

On the other hand, it is found in FIG. 6 that, in the case of Comparative Example 4 and Comparative Example 5, the capacity in Comparative Example 4 decreases relatively slowly even after about 90 cycles, whereas the capacity in Comparative Example 5 decreases at a much more rapid slope at about 107 cycles than in Comparative Example 4. In Comparative Examples 4 and 5, the negative electrodes are made of the lithium metal and the positive electrodes are made of the material in which the transition metal oxide is used as an active material. However, Comparative Examples 4 and 5 are different in that the fluorinated graphene oxide material is coated on the surface of the negative electrode side of the separator and the fluorinated graphene oxide material is coated on the surface of the positive electrode side of the separator in Comparative Example 5. In Comparative Example 4, lithium fluorite is formed on the surface of the negative electrode side of the separator during use of the lithium metal battery. On the other hand, in Comparative Example 5, the lithium fluorite is not formed between the separator and the surface of the positive electrode side during use of the lithium metal battery, or is formed in a very small amount compared to Comparative Example 4. Therefore, Comparative Example 5 shows a relatively small effect of securing stability and efficiency of the entire lithium metal battery according to the formation of lithium fluorite compared to Comparative Example 4, and the total capacity of the lithium metal battery of Comparative Example 5 rapidly decreases from the point of time of about 107 cycles compared to Comparative Example 4.

What is claimed is:

1. A method for making a separator coating layer for a lithium metal battery comprising preparing a fluorinated graphene oxide,
   wherein the preparing of the fluorinated graphene oxide comprises immersing a film of a graphene oxide material in a solution prepared by dissolving a compound comprising a fluorine element in a solvent for 60 to 90 hours, and
   wherein the solvent is one of 1,2-dichlorobenzene, chloromethane, dichloromethane, tetrahydrofuran, N-methyl-2-pyrrolidone, dichloroethane, pyridine, chlorobenzene, benzene, and toluene.

2. The method of claim 1, wherein the compound comprising the fluorine element is diethylaminosulfur trifluoride.

3. The method of claim 1, wherein the fluorinated graphene oxide is fluorinated by being immersed in the solution, and then washed with a hydrophilic material and a hydrophobic material sequentially.

4. The method of claim 3, wherein the fluorinated graphene oxide is washed sequentially with water, ethanol, acetone, tetrahydrofuran, and water.

5. A method for making a separator coating layer for a lithium metal battery comprising preparing a fluorinated graphene oxide,
   wherein the preparing of the fluorinated graphene oxide comprises mixing a metal fluoride and a graphene oxide followed by heat treatment,
   wherein the heat treatment is performed for 2 to 6 hours at a temperature of 400 to 800° C., and wherein the metal fluoride is one of cobalt (III) fluoride ($CoF_3$) and copper (II) fluoride ($CuF_2$).

* * * * *